(12) United States Patent
Ahorner et al.

(10) Patent No.: US 10,118,258 B2
(45) Date of Patent: Nov. 6, 2018

(54) METHOD FOR PRODUCING A PRELIMINARY MATERIAL FOR A MACHINING TOOL, AND CORRESPONDING PRELIMINARY MATERIAL

(71) Applicant: Voestalpine Precision Strip GmbH, Boehlerwerk (AT)

(72) Inventors: Leander Ahorner, Waidhofen/Ybbs (AT); Gerhard Mayrhofer, Strengberg (AT); Markus Neswadba, Kematen/Ybbs (AT)

(73) Assignee: Voestalpine Precision Strip GmbH, Boehlerwerk (AT)

( * ) Notice: Subject to any disclaimer, the term of this patent is extended or adjusted under 35 U.S.C. 154(b) by 42 days.

(21) Appl. No.: 15/039,241

(22) PCT Filed: Nov. 25, 2014

(86) PCT No.: PCT/EP2014/075563
§ 371 (c)(1),
(2) Date: May 25, 2016

(87) PCT Pub. No.: WO2015/075265
PCT Pub. Date: May 28, 2015

(65) Prior Publication Data
US 2017/0157713 A1  Jun. 8, 2017

(51) Int. Cl.
*B23K 31/02*  (2006.01)
*B23D 65/00*  (2006.01)
*B23K 101/20*  (2006.01)

(52) U.S. Cl.
CPC ............ *B23K 31/025* (2013.01); *B23D 65/00* (2013.01); *B23K 2201/20* (2013.01)

(58) Field of Classification Search
None
See application file for complete search history.

(56) References Cited

U.S. PATENT DOCUMENTS 2,683,923 A  7/1954  Replogle
2,686,439 A  8/1954  Tobert
(Continued)

FOREIGN PATENT DOCUMENTS

AT           154337      9/1938
CN         1917980 A     2/2007
WO    2006/005204 A1    1/2006

OTHER PUBLICATIONS

Merz, Machine Translation of Descripton for WO 2006/005204, Jan. 2006.*

(Continued)

*Primary Examiner* — Devang R Patel
(74) *Attorney, Agent, or Firm* — Oblon, McClelland, Maier & Neustadt, L.L.P.

(57) ABSTRACT

A method for producing a primary material for a machining tool and such a primary material, for example a primary material for a saw blade, a saw band, a cutting line, a punching knife or a blade, wherein a first flat carrier is arranged with one edge thereof along an edge of a second flat carrier, wherein the first and second carriers are welded together along the edges by supplying at least a first particulate cutting edge material, and the first and second carriers are separated again substantially along the welded joint formed as noted above.

12 Claims, 3 Drawing Sheets

(56) References Cited

U.S. PATENT DOCUMENTS

| | | | |
|---|---|---|---|
| 3,766,808 A | 10/1973 | Cremisio et al. | |
| 4,644,127 A | 2/1987 | La Rocca | |
| 7,373,857 B2 | 5/2008 | Dion et al. | |
| 7,451,678 B2* | 11/2008 | Dion | B23D 61/12 83/835 |
| 2004/0016132 A1* | 1/2004 | Dion | B21K 11/02 30/350 |
| 2004/0237722 A1* | 12/2004 | Ponemayr | B22F 7/08 76/112 |
| 2008/0072411 A1* | 3/2008 | Ahorner | B23D 61/12 29/415 |
| 2008/0277454 A1 | 11/2008 | Dion et al. | |
| 2008/0280157 A1 | 11/2008 | Dion et al. | |
| 2009/0114064 A1* | 5/2009 | Ahorner | B23D 65/00 76/112 |

OTHER PUBLICATIONS

International Search Report dated Jan. 5, 2015 for PCT/EP2014/075563 dated Nov. 25, 2014.
Chinese Office Action with English translation dated Dec. 25, 2017 in corresponding Chinese Patent Application No. 201480073929.5, citing documents AA and AO therein (20 pages).

* cited by examiner

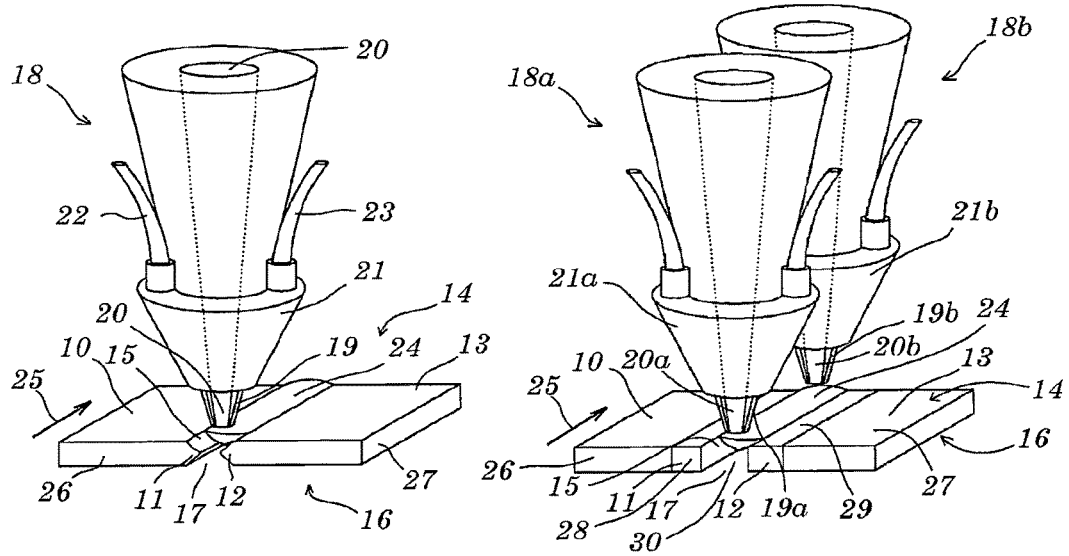
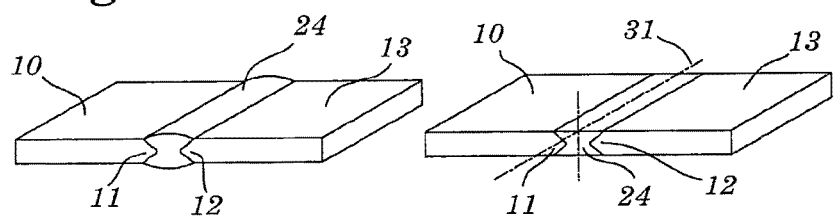
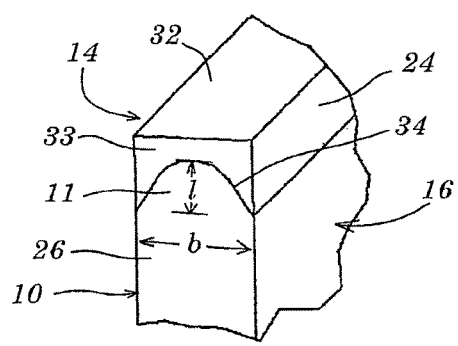
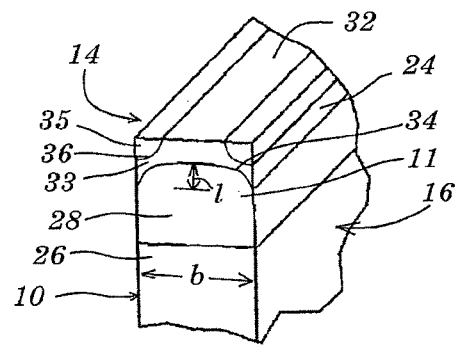

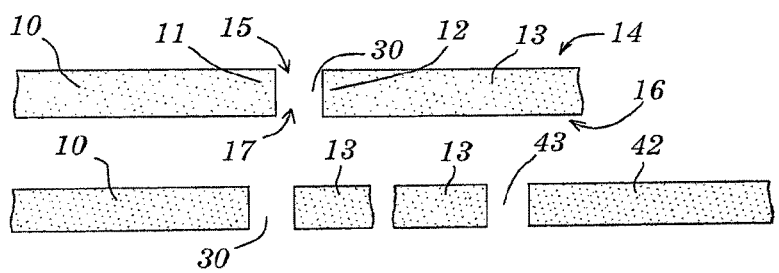
*Fig. 14*
*Fig. 15*
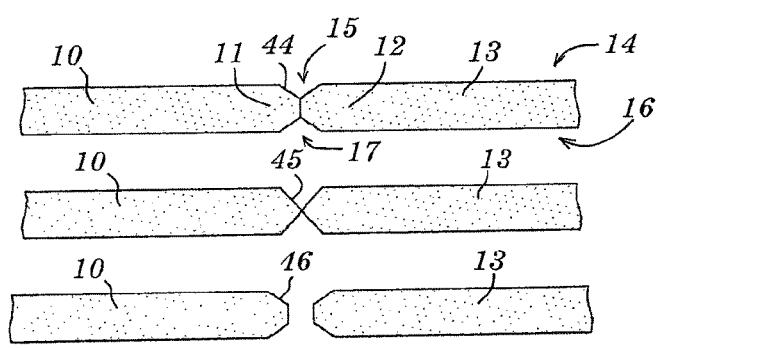
*Fig. 16*
*Fig. 17*
*Fig. 18*
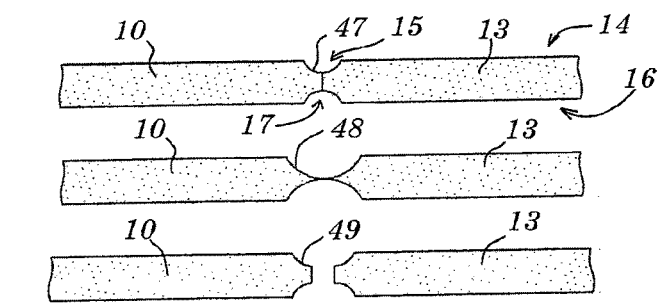
*Fig. 19*
*Fig. 20*
*Fig. 21*
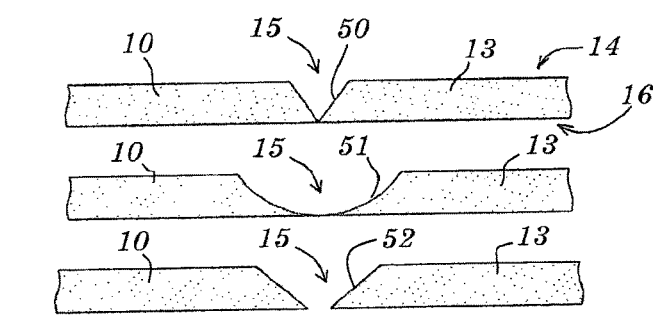
*Fig. 22*
*Fig. 23*
*Fig. 24*

METHOD FOR PRODUCING A PRELIMINARY MATERIAL FOR A MACHINING TOOL, AND CORRESPONDING PRELIMINARY MATERIAL

The present invention relates to a method for producing a preliminary material for a machining tool, in particular a preliminary material as a starting component for producing a saw blade, a saw band, a cutting line, a punching knife or a blade, for example a stripping blade. The invention also relates to a corresponding preliminary material.

Machining tools, such as for example band saws for metal working, must meet a whole series of requirements in order to be economically usable. The band material must be flexible and elastic, it must not only be able to absorb and withstand the tensile stresses to which the saw band is already exposed before it is fitted but it must also additionally be able to withstand the flexural forces to which the band is subjected during the sawing process and the corresponding torsional moments and stresses that the band experiences during the turning about its longitudinal axis above and below the cutting table or before and after the cutting location. In addition to this there are dynamic loads, which are caused by the engagement of the individual teeth in the material to be worked, not least thermal loads due to temperatures, which can reach 600° C. and more in the region of the teeth and in particular at the tips of the teeth. Since the cooling of the band causes this heat to be removed, there is not only this thermal loading, but also the formation of a temperature gradient and the associated thermal stresses, which overlay the mechanical stresses and in particular the dynamic stresses.

Since the requirements with regard to toughness and bending strength of the saw band on the one hand and hot hardness and wear resistance of the saw teeth on the other hand can only be satisfied insufficiently by a single material, for example a metal or a metal alloy, so-called bimetallic bands or bimetallic sheets are used with preference as the starting component or preliminary material for high-performance machining tools. Such bimetallic bands or sheets usually consist of a sheet-like base of a base material, which has the necessary toughness and flexural strength for the later machining tool, for example of low-alloy steels or else of carbon steel. Usually, a wire of a cutting-edge material, which has a greater wear resistance and a greater hot hardness, is welded onto a narrow edge of the sheet-like base. An edge wire of high-speed steel (HSS) is typically used as the cutting-edge material.

The saw manufacturer then produces the saw blade or saw band from this preliminary material. For this purpose, the tooth profile of the later saw blade or saw band is fashioned, for example milled or ground out, at the edge of the sheet-like base at which the welded high-speed steel wire is located. This has the effect of creating teeth with a pointed region of high-speed steel, while the rest of the saw blade or band consists of the tough, elastic steel of the sheet-like base. Depending on the set of requirements for the saw, the teeth may consist completely of cutting-edge material, but with preference only the tips of the teeth consist of cutting-edge material, while the foot of the teeth reaches into the sheet-like base and consequently consists of the tough, elastic base material.

However, such a conventionally produced bimetallic band or sheet has the disadvantage that the fashioning of the tooth profile involves a considerable loss of cutting-edge material, since the material from the spaces between the teeth cannot be put to any other use. To solve this problem, it has been proposed for example in this applicant's international patent application WO 2006/000256 A1 to use a preliminary material which consists of two sheet-like bases that are connected to one another by means of an edge wire of a high-speed steel for producing saw blades or saw bands. By suitable choice of a separating line, this composite can be separated so as to produce two bimetallic bands of which the edge profile already corresponds approximately to the tooth profile of the later saw blade or band. After separation, each bimetallic band is re-worked until the ultimately desired form of the teeth is achieved. In this way, the loss of material in terms of cutting-edge material is lower.

A similar method is known from WO 2006/005204 A1, where likewise a bimetallic band is used, comprising a strip of high-speed steel that is welded on each of both sides with a base band. It is mentioned that the bimetallic preliminary material in the form of a band can be produced in a wide variety of ways, for example by powder metallurgy or casting, without however going into the production process in any more detail.

It is known from U.S. Pat. No. 2,683,923 A to weld the base and the cutting-edge material to one another along a number of bands and then to separate them in the middle of the cutting-edge material. There, both the cutting-edge material and the base material are materials in the form of a band. Welding wire may be added as further material.

However, the methods described so far still have the disadvantage that the cutting-edge material used must on the one hand be able to be produced in the form of edge wires and on the other hand must be able to be welded to the sheet-like base. These preconditions considerably restrict the choice of materials both for the sheet-like base and for the cutting edges.

In the U.S. Pat. No. 7,373,857 B2, a description is given of a method for producing a machining tool where a sheet-like composite material of different metal alloys is likewise used. In this case, a wire of cutting-edge material is placed into a groove cut into a sheet-like base and is embedded in by pressure and heat treatment. Although this method has cost advantages, since for example round wire can be used instead of edge wire, here too the choice of material is restricted, since on the one hand the cutting-edge material has to be in the form of wire and on the other hand not every combination of cutting-edge material and material of the sheet-like base allows a sufficiently stable connection of the two materials.

EP 1 404 484 B1 discloses a method for producing a machining tool consisting of a base material in the form of a band or sheet, on the substantially upright edge of which a cutting-edge region is applied in the form of a powdered alloy and in the course of being applied is melted by means of a laser beam and solidified on the edge. With this method, a much greater number of cutting-edge materials are available, since the precondition that the cutting-edge material can be produced as edge wire or round wire is no longer applicable. However, the disadvantage of producing the cutting-edge region by powder metallurgy is that the achievable speed of the process is lower than when welding an edge wire.

In U.S. Pat. No. 3,766,808 A, a description is given of a method for producing a bimetallic band in which two plates or slabs of base material and a powdered cutting-edge material are connected to one another by hot-isostatic pressing. The composite produced in this way is subsequently rolled out to form a bimetallic band, which is separated along the later cutting edge. However, this method cannot be carried out continuously. Furthermore, on account of the necessary high temperatures and pressures, the hot-isostatic pressing can only be carried out in an evacuated space. Finally, the production of the bimetallic band requires a high degree of working of the plate by multiple rolling and interim annealing, which increases the production costs.

The present invention is therefore based on the technical problem of providing a continuously operating method for producing a preliminary material for a machining tool that can be realized inexpensively and easily and allows the use of a great variety of materials for the sheet-like base and the cutting-edge material. Furthermore, a corresponding preliminary material for producing a machining tool is to be provided.

The technical problem is solved by the method for producing a preliminary material for a machining tool according to the present claim 1; advantageous developments of the method are the subjects of the dependent claims.

The invention accordingly relates to a method for producing a preliminary material for a machining tool, in particular a saw blade, a saw band, a cutting line or a punching knife, wherein a first sheet-like base is arranged with one of its edges along an edge of a second sheet-like base, the first and second bases are welded to one another along the edges while supplying at least one particulate cutting-edge material, in particular a cutting-edge material in the form of powder, and the first and second bases are separated again substantially along the welded connection thus created. Arranging the two sheet-like bases along their edges in relation to one another means that the sheet-like bases are arranged at least approximately parallel to one another in the region where the particulate cutting-edge material is supplied. The edges lying opposite one another of the sheet-like bases may in this case touch or be at a certain, predetermined distance. Welding has the effect that an alloying zone comprising the edge material of the sheet-like bases and the particulate cutting-edge material is respectively created in the contact region between the edges of the sheet-like bases and the particulate cutting-edge material. In the simplest case, separating the two sheet-like bases may take place along a straight center line through the welded connection created. However, the separating line does not have to run exclusively in the welded connection, but may also have a more complicated form, and possibly also reach partially into the sheet-like base, in order that the separation already produces an edge profile that approximates to the desired later form of the teeth. The method according to the invention can operate continuously, since not only the powdered cutting-edge material is supplied continuously, but also the base material in the form of a band, which is for example unwound from spools, acts as it were as a continuous band.

The method according to the invention has numerous advantages. Since the cutting-edge material is applied in the form of particles, there is no restriction in the choice of cutting-edge material to materials that can be produced as wire. Even when using materials that are in principle also obtainable as wire, there is a great cost advantage in using a particulate material, in particular a powdered material, since the costs involved in producing the wire are no longer applicable. Furthermore, the limitation on the speed of the process that producing the cutting-edge region by powder metallurgy entails is lessened by the fact that, with the method according to the invention, after separation of the welded connection two bimetallic bands or sheets that have been produced by a single welding operation are created. Effectively, the speed of the process is therefore doubled in comparison with the method known from EP 1 404 484 B1.

The effective speed of the process can be increased still further by adding further sheet-like bases and welding them while likewise supplying particulate cutting-edge material, so as to create a composite of multiple strips of base material that are connected to one another by means of strips of cutting-edge material arranged in between. By contrast with the method known from U.S. Pat. No. 3,766,808 A, the method according to the invention operates continuously and does not have any special requirements for the production space in terms of temperatures, pressures or evacuability.

The two sheet-like bases can butt against one another with their edges and the particulate cutting-edge material can be applied to the connecting region of the two bases. Preferably, however, the first and second sheet-like bases are arranged in relation to one another in such a way that at least one recess is formed between the first and second bases, the at least one cutting-edge material being fed into the recess. Thus, after the two bases are separated along the welded connection, an edge region which then only consists of cutting-edge material is created, so that tooth tips that likewise only consist of cutting-edge material can be fashioned during the later further processing.

The sheet-like bases may be of any desired form that is suitable for creating a machining tool such as a saw blade, a saw band, a cutting line or a punching knife or a blade during the later further processing. With particular preference, however, in the method according to the invention the sheet-like bases are however provided in the form of bands of metal or a metal alloy, in particular continuous bands, that are for example unwound from a spool and supplied to a welding device.

With preference, therefore, the first and second sheet-like bases in the form of bands are arranged at a distance from one another, so that edges lying opposite one another of the first and second sheet-like bases define the recess into which the particulate cutting-edge material is then fed.

The edge of the first sheet-like base and/or the edge of the second sheet-like base may also be pre-worked and have a wide variety of forms, which then ultimately determine the cross-sectional profile of the cutting-edge region after the connection is separated. For example, the edges of the sheet-like carriers may be beveled or define concave subportions of the recess for introducing the cutting-edge material. In the case of worked edges, the edges do not have to be at a distance from one another, but may also butt against one another, since suitable depressions for forming the recesses for supplying the particulate cutting-edge material have already been introduced by the pre-working.

The first and second bases may be welded to one another in a wide variety of ways, for example in that, in the region of the edge(s), the first and/or second sheet-like base and/or the first particulate cutting-edge material is/are at least partially melted and the molten material composite is left to solidify at least partially. Typically, at least one of the materials involved, for example the edge region of the first base and/or the edge region of the second sheet-like base, is melted, so that, during solidifying, a material composite is created from the first and second bases in the edge region and the supplied particulate cutting-edge material. The cutting-edge material itself may likewise melt, but it may also become incorporated as particulate cutting-edge substance in the welding region. The matrix in which the particulate cutting-edge material becomes incorporated may be a material that is supplied together with the particulate cutting-edge material and itself melts when energy is applied. Alternatively, the peripheral region of the first and/or second base or a mixed region of the first and second base may serve as a matrix for a non-melting particulate cutting-edge material. Used with preference, however, is a particulate cutting-edge material that itself melts during the welding of the first and second bases and establishes the welded connection between the first and second bases, in particular when the first and second bases are arranged at a distance from one another.

As a final step of the method according to the invention, numerous separating methods that are known from the prior art, such as cutting, gap cutting, punching, laser cutting, waterjet cutting or the like, may be used for separating the welded connection thus established.

The first and second sheet-like bases preferably consist of a main body of a base material, for example a metal or a metal alloy, for example a low-alloy tool steel. Then, with the method according to the invention, a corresponding high-strength cutting-edge region is created at the edges of the two sheet-like bases by supplying the particulate cutting-edge material.

The first and second sheet-like bases that are used in the method according to the invention may, however, already have in each case in addition to the main body of the usual base material an edge region that consists of a further cutting-edge material. Such sheet-like bases may either have been produced in advance by the method according to the invention or they are bimetallic bands that have been produced by a method known from the prior art, for example by welding an edge wire of the second cutting-edge material onto the main body of base material. Consequently, an additional region of first cutting-edge material is added to the further cutting-edge material by the method according to the invention, so as to produce a multilayered band. The first and second cutting-edge materials are preferably different materials.

Alternatively or in addition, before separating the composite comprising the first and second bases and the first cutting-edge material, at least a second particulate cutting-edge material may be supplied and melted, in order in this way to produce a two-layered or three-layered composite material. This process can of course also be continued in multiple stages with further particulate cutting-edge materials, in order to produce a multilayered composite material.

The first particulate cutting-edge material and possibly the second particulate cutting-edge material or the further particulate cutting-edge materials are preferably supplied in the form of a powder, granules, a paste or a filling wire. In the case of a filling wire, the particulate cutting-edge material in the form of a powder, granules or a paste is located inside a tubular wire. The wire itself may for example consist of the material of the base. It is, however, particularly preferred for it to be supplied in the form of a powder.

The particulate cutting-edge material may be supplied in a wide variety of ways. If the particulate cutting-edge material is in the form of powder or a paste, it may be supplied by means of a nozzle, for example an annular nozzle or a slit nozzle. If the particulate cutting-edge material is in the form of a filling wire, it may be supplied for example from a storage spool.

The cutting-edge materials used preferably contain metals and/or metal alloys, for example metals or metal alloys that themselves melt during the welding process, such as for example high-speed steel (HSS).

All common HSS materials that are already used as wire for bimetal for saw blades or saw bands may for example be used as particulate cutting-edge materials (by way of example S 2-10-1-8 (M42, 1.3247) or S 6-5-2 (M2, 1.3343)). In addition, all other HSS materials that are not available as wire may also be used in the method according to the invention. Here, the alloy composition may go in the direction of 0.5-2.5% C, 0.1-1.0% Si, 0.1-0.7% Mn, 3.0-6.0% Cr, 2.0-11% Mo, up to 6.5% V, up to 15% W, to 15% Co. Furthermore, carbide-forming elements such as Nb and Ti may be added, with a percentage content of 5%.

Alternatively or in addition, the cutting edge materials may also contain metallic hard materials. Metallic hard materials are borides, carbides, silicides and nitrides of high-melting transition metals, or else oxides in combination with workable microstructural constituents, i.e. a matrix in which the metallic materials are incorporated. Metallic hard materials include, for example, TiC, TaC, WC, $TiB_2$, $MoSi_2$, $Al_2O_3$, $SiO_2$), from which solid solutions (for example TiC—WC, $Mo_2C$—TiC), double carbides or complex carbides (for example $Co_3W_3C$, $Ni_3W_3C$) and intermetallic compounds can be derived. Furthermore, mixtures of HSS materials with metallic hard materials also come into consideration. New cutting-edge substances obtained by mechanical alloying are of course similarly conceivable. The ternary systems Fe—Co—Mo and Fe—Co—W and the quaternary system that can be derived therefrom Fe—Co—Mo—W also come into consideration as cutting-edge material. These systems may form very fine precipitates in the course of precipitation hardening, which leads to an enormous increase in hardness. In the solution-annealed state, such alloys are correspondingly soft and can also be cold-worked. Usual alloy constituents of such precipitation hardenable alloys are in the range of 23-25% Co and a W+Mo/2 combination of 10-31%. Fe and smelting-induced impurities form the remainder.

In the method according to the invention, all common backing materials come into consideration as base materials. For example, usual low-alloy steels, which have great toughness and fatigue strength, may be used. Suitable sheet-like bases have for example a chemical composition in the range of 0.2-0.6% C, 0.1-1.0% Si, 0.3-2.0% Mn, 0.5-7.0% Cr, 0.1-2.6% Mo, up to 0.6% V and up to 5.0% W. Small additions of Nb and Ti in the range of up to 0.5% in total may be admixed for grain refinement. Iron and smelting-induced impurities form the remainder. Carbon steel with 0.50 to 1.50% C, up to 1.5% Si and up to 1.5% Mn may be used as the base material.

The first and second bases are welded to one another by heating the connecting region and suitably supplying energy, possibly while applying pressure. The energy is supplied for example by means of a welding device. The supply of energy must be sufficient to melt at least one of the materials involved. Preferably, the first and second bases are welded to one another by supplying energy by means of one or more lasers. However, the energy may also be supplied in some other way, for example by electron beams. In particular, when the particulate cutting-edge material is supplied in the form of a paste or a filling wire, any other conventional welding device, for example an arc or inert-gas welding device or a resistance welding device, may also be used.

Depending on the later intended use, the particulate cutting-edge material may only be supplied on one side of the sheet-like bases. Preferably, however, the sheet-like cutting-edge material is applied on both sides of the sheet-like bases, that is to say on the upper side and underside of the sheet-like bases. This may take place simultaneously or successively, for example the sheet-like bases may be arranged vertically in the region of the welding device and the particulate cutting-edge material supplied simultaneously from both sides. In the case of a horizontal arrangement of the sheet-like bases in the welding region, the two sheet-like bases may be guided over a deflecting roller after application of the particulate cutting-edge material on the upper side, so that in a compact region of the process line the underside of the bases is upwardly directed and ready for the cutting-edge material to be applied. In particular if the sheet-like bases take the form of bands, it is for example also conceivable to turn the two bands through an angle of 180° after applying the particulate cutting-edge material on the upper side over a certain running length of the band, so that a little further downstream the original underside of the bases is upwardly directed.

The invention also relates to a sheet-like preliminary material for producing a machining tool, in particular a saw blade, a saw band, a cutting line or a punching knife, that is obtainable by the method described above.

According to a first variant, the sheet-like preliminary material according to the invention comprises a sheet-like base, which has a main body of a base material, and a cutting-edge region of at least a first cutting-edge material, the sheet-like base and the cutting-edge region being connected to one another by way of a first alloying zone. By the method according to the invention, the first cutting-edge material is applied in the form of particles to the sheet-like base in such a way that the cutting-edge region created and the sheet-like base overlap over a cross-sectional length that lies in the range of 0.2-3 times the cross-sectional width of the sheet-like base. Preferably, the cutting-edge region created and the sheet-like base overlap over a cross-sectional length that lies in the range of 0.3-2 times, with particular preference in the range of 0.5-1.5 times, the cross-sectional width of the sheet-like base. By contrast with a conventional bimetallic band produced from edge wire, there is therefore no definite height in the cross section of the preliminary material according to the invention at which the original sheet-like base goes over into the edge region that is created from the cutting-edge material originally supplied in the form of particles. Rather, for example, the sheet-like base reaches further into the edge region in the interior of the sheet-like preliminary material than in the outer region on the upper side and/or the underside. Depending on the form of the edge of the original sheet-like base, the sheet-like base may also reach further into the edge region of cutting-edge material on the upper side and/or the underside than in the interior.

The sheet-like base may consist of a main body of base material. Alternatively, the sheet-like base may comprise a main body of base material and an edge region of at least one further cutting-edge material, so that with the method according to the invention a multilayered preliminary material is created. Thus, for example, a bimetallic band that has been produced by a method known from the prior art may be used for example as the sheet-like base.

According to a variant of a multilayered preliminary material, the sheet-like preliminary material according to the invention comprises a sheet-like base, which has a main body of a base material, and a cutting-edge region of at least one cutting-edge material, the cutting-edge region having at at least one corner a corner region of another cutting-edge material. This variant of the preliminary material is characterized in that the corner region and the cutting-edge region are connected to one another by way of an alloying zone. This allows the teeth to be further optimized, in that for example corners with a particularly great wear resistance and in particular cutting strength can be produced, while the middle region of the teeth has a greater toughness and flexural strength than the corners, but at the same time still a greater wear resistance than the material of the main body. The other cutting-edge material for the corner region is in this case supplied by the method according to the invention. The cutting-edge region comprising at least one cutting-edge material may have been produced by the method according to the invention from a first particulate cutting-edge material or it may consist of a further cutting-edge material, which has for example been welded onto the main body as edge wire. Consequently, here too the sheet-like base may also consist of a main body of base material or additionally comprise an edge region of at least one further cutting-edge material.

With particular preference, the sheet-like preliminary material according to the invention is a band. By the method according to the invention, such a band may be wound up in the form of a coil for further processing and be delivered for example to a saw manufacturer.

The invention is explained in more detail below with reference to the accompanying drawings.

In the drawings:

FIG. 1 shows a schematic representation of the supply of particulate cutting-edge material and the welding of two sheet-like bases in the method according to the invention;

FIG. 2 shows a variant of FIG. 1 in which two particulate cutting-edge materials are supplied;

FIG. 3 shows the preliminary material according to the invention of FIG. 1 after the welded connection has been established;

FIG. 4 shows the preliminary material according to the invention of FIG. 3 after the flattening of the welded connection;

FIG. 5 shows the preliminary material according to the invention of FIG. 4 after the separation of the welded connection;

FIG. 6 shows the preliminary material according to the invention of FIG. 2 after the flattening and separation of the welded connection;

FIGS. 14-24 show variants of the pre-worked edges of the sheet-like bases used in the method according to the invention.

Figures 7, 8, 9:
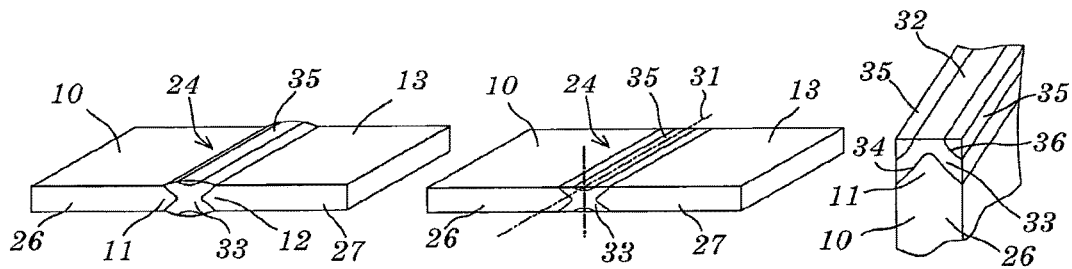
FIG. 7 shows a variant of FIG. 3 with two cutting-edge materials.
FIG. 8 shows the variant of FIG. 6 after the flattening of the welded connection.
FIG. 9 shows the variant of FIGS. 6 and 7 after the separation of the welded connection.
Figures 10, 11:
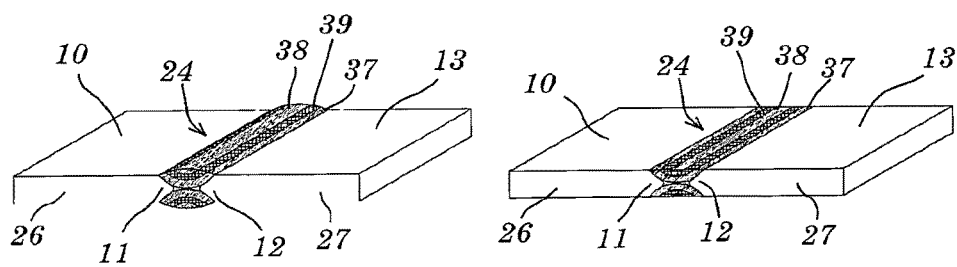
FIG. 10 shows a further variant of the preliminary material according to the invention after the welding.
FIG. 11 shows the preliminary material of FIG. 9 after the flattening of the welded connection.

In FIG. 1, a first embodiment of the method according to the invention for producing a preliminary material for a machining tool, for example a preliminary material for a saw blade, a saw band or a cutting line, is schematically shown by way of example. A first sheet-like base 10 can be seen, which is arranged with its edge 11 at a certain distance from and along the edge 12 of a second sheet-like base 13. To provide a better overview, in the example shown the sheet-like bases are shown as short portions. Preferably, however, they are continuous bands, which are for example unwound from spools, which are likewise not shown here. In the example shown, the edges 11 and 12 are respectively beveled on the upper side and the underside. Between the two bases 10, 13, an upper recess 15 is formed on the upper side 14 and a lower recess 17 is formed on the underside 16. By means of a welding head 18 of a welding device that is not shown any further, a first particulate cutting-edge material 19 is introduced into the recess 15 and melted by means of a laser beam 20, so that the first base 10 and the second base 13 can be welded to one another. In the example shown, the welding head 18 of the welding device has for this purpose an annular nozzle 21, to which the particulate cutting-edge material 19 is supplied by means of lines 22, 23. However, any other kind of nozzle may also be used. The annular nozzle 21 shown produces a conical jet of the particulate cutting-edge material 19, which is directed onto the upper recess 15. The laser beam 20 is made to pass through the center of the welding head 18 and the center of the conical jet of the cutting-edge material 19 and is focused onto a region in which the cutting-edge material enters the recess 15. In this region, the welding process takes place. Depending on the materials used, the cutting-edge material 19 and/or matrix material supplied together with the cutting-edge material and/or the base material in the edge region 11, 12 of the sheet-like bases 10, 13 are at least partially melted, so that a welded connection 24 is created.

The sheet-like bases, i.e. in the example shown the continuous bands, are moved under the stationary welding head 18 along the arrow 25.

In the case of the embodiment shown in FIG. 1, the sheet-like bases 10, 13 merely have in each case a main body 26, 27 of base material, so that the later cutting-edge region is merely formed by the cutting-edge material 19 supplied as powder.

FIG. 2 shows a variant of the embodiment of FIG. 1. Elements that correspond to the elements already described in conjunction with FIG. 1 are designated by the same reference numerals. In the variant of FIG. 2, various modifications of the embodiment of FIG. 1 are shown. However, the invention is not restricted to the combination of these modifications that is shown, but instead any of the modifications described below may be realized individually or in any desired combination of a number of modifications. Thus, in the variant of FIG. 2, sheet-like bases 10, 13 which not only have in each case a main body 26, 27 of base material but also already an edge region 11, 12 of a further cutting-edge material 28, 29 are used. The sheet-like bases 10, 13 of FIG. 2 may be for example conventional bimetallic bands. Furthermore, the sheet-like bases 10, 13 do not have beveled edges as in FIG. 1, but straight edges 11, 12. The two sheet-like bases 10, 13 are again arranged at a distance, so that the upper recess 15 and the lower recess 17 together form a continuous gap 30 between the bases. Finally, in the variant of FIG. 2, two welding heads 18a, 18b arranged one behind the other are used instead of one welding head 18. By analogy with the procedure of FIG. 1, the welding head 18a guides a first cutting-edge material 19a into the upper recess 15 and produces a welded connection 24. With the welding device 18b, a further cutting-edge material 19b may be applied to produce a multilayered cutting-edge region. If no further cutting-edge material has to be applied, it is also possible to use the laser device of the second welding device 18b, or a similar heat source, for heat-treating the welded connection 24, in order to reduce stresses in the welded connection.

In the representations of FIGS. 1 and 2, cutting-edge material in the form of particles is introduced from the upper side 14 into the upper recess 15. Depending on the shaping of the recess, in particular if the upper recess and the lower recess together form a straight gap 30, as in FIG. 2, and if the cutting-edge material is for example supplied as a filling wire, a supply of cutting-edge material from one side may be sufficient. Usually, however, a supply of the cutting-edge material from the upper side and the underside of the sheet-like bases, simultaneously or successively, is preferred. For a supply that takes place successively, the arrangement of sheet-like bases 10, 13 may for example be led or twisted over a deflecting roller (not shown), so that the underside 16 shown in FIGS. 1 and 2 is subsequently upwardly directed and the upper side 14 with the already produced welded connection 24 is downwardly directed.

In particular if the two sheet-like bases 10, 13 are arranged at a distance, it is advantageous if the recess that is not being filled with cutting-edge material at the time runs on a die (not shown) that prevents the cutting-edge material from passing through. The die may be adapted to the form of the recess.

It goes without saying that the sheet-like bases 10, 13 of FIGS. 1 and 2 may also be arranged without any distance from one another, that is to say so that the edges 11, 12 butt against one another.

In FIG. 3, the result of the welding process of FIG. 1, that is to say for the case where the first and second bases were arranged at a distance during the welding, is shown. It can be seen that the welded connection 24, which substantially consists of the particulate cutting-edge material 19 supplied and melted, protrudes beyond the upper side or underside of the sheet-like bases 10, 13 in the form of a weld elevation. In such a case, the region of the welded connection is preferably also flattened, so that a flat composite is obtained, as shown in FIG. 4. Before or as an alternative to the flattening, the weld elevation may possibly also be ground away. In addition or as an alternative to the flattening, the welded connection 24 may also be worked by means of a flattening operation. In this way, a preliminary material that can be processed into special tooth geometries, for example trapezoidal teeth, with less effort than the methods known from the prior art can be produced.

The base 10 is subsequently separated substantially along the welded connection 24, for example along the separating line 31 shown in FIG. 4. After the separation, and possibly further working steps, the preliminary material according to the invention is obtained in the form of two sheet-like bases, advantageously bands, with in each case an edge region that consists of a cutting-edge material. The preliminary material according to the invention may be for example two bimetallic bands, which can subsequently be further processed into a machining tool by introducing teeth into the edge region. In the example shown, the separating line 31 is a straight center line through the welded connection 24. However, the separating line may also have a more complicated form and for example be approximated to the desired later form of the teeth. The separation of the two sheet-like bases is preferably already carried out during the production of the preliminary material according to the invention, so that two bands each with a cutting edge are created.

In FIG. 5, one half of the preliminary materials according to the invention that is created after the cut shown in FIG. 4 is shown in cross section. It can be seen firstly that, after the cut along the line 31 in FIG. 4, a cut surface 32 has been created in the welded connection 24. The sheet-like base 10 with the main body 26 and original edge region 11 of base material is then surrounded by a cutting-edge region 33 of the cutting-edge material 19 originally in the form of particles. It is characteristic of the method according to the invention, in which the cutting-edge material is applied in the form of powder to the edge region of the bases, that, by contrast with the welding on of an edge wire according to the prior art, a substantially horizontal weld seam/alloying zone is not created in the cross section of the finished band where the base material and the cutting-edge material go over into one another. Rather, the cutting-edge material reaches around the edge region of the sheet-like base, so that an overlapping of the cutting-edge region 33 and the edge region 11 of the sheet-like base 10 occurs on the upper side 14 and/or the underside 16 along the height of the finished sheet-like preliminary material, so that an alloying zone 34 between the regions 33, 11 typically does not run horizontally. The cutting-edge region 33 and the edge region 11 typically overlap along the height of the cross section over a length l, which corresponds approximately to 0.2 to 3 times the width b of the sheet-like base in the cross section. In this way, a particularly stable cutting edge is provided.

FIG. 6 shows a view corresponding to the view of FIG. 5 of a preliminary material according to the invention that is obtainable by the method of FIG. 2. In comparison with FIG. 5, the multilayered structure of the cutting-edge region of the preliminary material according to the invention can be clearly seen. Since the sheet-like base 10 already has originally a main body 26 of base material and an edge region 11 of a further cutting-edge material 28, the first cutting-edge region 33 of cutting-edge material 19a, applied by the method according to the invention, already represents the second layer of cutting-edge material. The first alloying zone 34 produced by the method according to the invention accordingly runs between the cutting-edge material 28 of the sheet-like base 10 and the cutting-edge region 33 of welded cutting-edge material 19a. It can be seen that, although the edges of cutting-edge material 28 were originally straight, as shown in FIG. 2, there is nevertheless again an overlapping of the base 10 of cutting-edge material 28 and the cutting-edge region 33 of cutting-edge material 19a along a length l. This overlapping occurs in the case of a straight edge mainly due to the spraying on and melting of the cutting-edge material 19a and the subsequent flattening of the welded connection 24 protruding beyond the upper side 14 of the sheet-like base. Since, according to FIG. 2, a second base material 19b in the form of particles, with a greater wear resistance than the base material 19a, has been applied centrally to the welded connection 24, the finished preliminary material of FIG. 6 has an additionally strengthened corner region 35 of this second base material 19b. Between the corner region 35 and the cutting-edge region 33 there runs a second alloying zone 36.

Shown in FIGS. 7 to 9 is a further variant of a multilayered structure of the cutting-edge region, as can be produced for example again with the two-stage welding device of FIG. 2. The variant of FIGS. 7-9 differs from the variant shown in FIGS. 2 and 6 merely in that the sheet-like bases 10, 12 do not have a cutting-edge region of a further cutting-edge material 28, 29, but in each case only comprise a main body 26, 27 of base material. Furthermore, in the case of the variant of FIGS. 7 to 9, the edge regions 11, 12 of the sheet-like bases 10, 13 are beveled instead of straight, as in FIGS. 2 and 6. In FIG. 7, the welded connection 24 before the rolling out is shown. It can be seen that the connecting region between the two sheet-like bases 10, 13 again comprises a first cutting-edge region 33 of the first cutting-edge material 19a. Again, the later corner region 35 of the second cutting-edge material 19b has been applied centrally to the first cutting-edge region 33. After the flattening of the welded connection (cf. FIG. 8) and the separation of the welded connection 24 along the cutting line 31, two preliminary materials according to the invention are created, one of which is shown by way of example in FIG. 9. The preliminary material again has a sheet-like base 10, here both the main body 26 and the edge region 11 consisting of the base material. Adjoining thereto, connected by way of an alloying zone 34, there is then the cutting-edge region 33, applied by the method according to the invention, of the first cutting-edge material 19a, which has a cut surface 32. In addition to the cutting-edge region 33, the variant of FIG. 9 has a corner region 35 consisting of second cutting-edge material 19b, so that, by appropriate choice of material, it can be ensured for example that the cutting corners of the teeth of a saw blade or saw band that are fashioned from the preliminary material of FIG. 9 have a particularly great resistance. The cutting-edge region 33 and the corner region 35 are connected to one another by way of a second alloying zone 36.

Figures 12, 13:
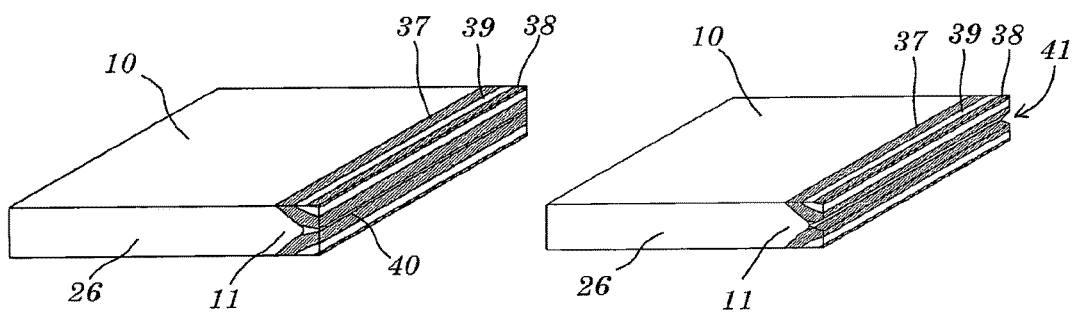
FIG. 12 shows the preliminary material of FIG. 10 after the separation of the welded connection.
FIG. 13 shows a further variant of the preliminary material of FIG. 11.

In FIGS. 10-13, a further variant of a multilayered cutting-edge structure is shown. In the example shown, two layers 37, 38 of a cutting-edge material are separated by a layer 39 of a material with different properties. After the establishment of the welded connection (FIG. 10) and the flattening (FIG. 11) and separation of the welded connection, the preliminary material shown in FIG. 12 is created. The corresponding band may be used directly for the production of tooth profiles in the cutting-edge region. Or else, as shown in FIG. 13, first a mixed region 40, which can still be seen in FIG. 12 and can contain a higher proportion of base material, in particular when there is a small distance between the edges 11, 12 of the sheet-like bases 10, 13, and can therefore have a lower hardness than the layers of cutting-edge material 37 and 38, may be cut out by means of a groove 41, for example a wedge-shaped groove (cf. FIG. 13). In this way, teeth with multiple cutting edges can be produced during the later further processing.

In FIGS. 14 to 24, a wide variety of arrangements of the base bands 10, 13 and the form of their possibly pre-worked edges 11, 12 are shown.

In FIG. 14, the two sheet-like bases 10, 13 are arranged at a distance and the edges 11, 12 are un-worked, so that the upper recess 15 and the lower recess 17 form a continuous gap 30 between the bases 10, 13, as in FIG. 2. In FIG. 15, corresponding base bands 10, 13 are arranged, but a further base band 42 is provided, so that a further recess 43, to which cutting-edge material can likewise be supplied, is defined between the second base band 13 and the further base band 42. In this way, for example, four preliminary materials in the form of bands can be produced simultaneously, which increases the speed of the process. It goes without saying that the parallelization can be increased further by further base bands.

FIGS. 16, 17 and 18 show variants of the sheet-like bases 10, 13, in which the edges 11, 12 have different bevelings 44, 45, 46. Furthermore, the bases 10, 13 may be arranged butting against one another, as in FIGS. 16 and 17, or at a distance from one another, as in FIG. 18.

In FIGS. 19 to 21, the edges 11, 12 of the sheet-like bases 10, 13 are provided with symmetrical depressions 47, 48, 49, which in the case of the bases being arranged adjacent one another (either at a distance as in FIG. 21 or not at a distance as in FIG. 19 or 20), form the corresponding upper and lower recesses 15, 17 for the introduction of the cutting-edge material.

While in the variants of FIGS. 16 to 21 the bevelings or the depressions at the edges of the sheet-like bases 10, 13 are formed symmetrically on the upper side 14 or the underside 16 of the sheet-like bases 10, 13, variants with an asymmetric configuration of a beveling 50 or depressions 51, 52 are shown in FIGS. 22 to 24. In the cases shown, the edges are pre-worked such that only upper recesses 15 are created. In such cases, it may be sufficient if cutting-edge material is only supplied from the upper side 14.

The invention claimed is:

1. A method for producing a preliminary material for a machining tool, or for a saw blade, a saw band, a cutting line, a punching knife or a blade, the method comprising:
    arranging a first sheet-like base with one of its edges along an edge of a second sheet-like base to form at least one upper recess and at least one lower recess between the first and second sheet-like bases;
    welding the first and second sheet-like bases to one another along the edges thereof while supplying at least a first particulate cutting-edge material into said upper and lower recesses and completely filling said upper and lower recesses at least with the first particulate cutting-edge material; and
    separating the first and second sheet-like bases along a center line of welded connection thus created.

2. The method as claimed in claim 1, wherein the first and second sheet-like bases are in a form of bands.

3. The method as claimed in claim 1, wherein said one of the edges of the first sheet-like base and/or the edge of the second sheet-like base are pre-worked.

4. The method as claimed in claim 1, wherein the first and second sheet-like bases are welded to one another such that, in a region of the edges thereof, one or more of the first sheet-like base, the second sheet-like base, and the first particulate cutting-edge material are at least partially melted to form a molten material composite and the molten material composite is left to solidify at least partially.

5. The method as claimed in claim 1, wherein the first sheet-like base and/or the second sheet-like base comprise a main body of a base material.

6. The method as claimed in claim 5, wherein the first sheet-like base and/or the second sheet-like base include an edge region of a further cutting-edge material.

7. The method as claimed in claim 1, wherein, before the separating of a composite comprising the welded first and second sheet-like bases and the first particulate cutting-edge material, at least a second particulate cutting-edge material is supplied and melted.

8. The method as claimed in claim 1, wherein the first particulate cutting-edge material is applied in a form of a powder, granules, a paste, or a filling wire.

9. The method as claimed in claim 1, wherein the first particulate cutting-edge material includes metals and/or metal alloys.

10. The method as claimed in claim 1, wherein the first particulate cutting-edge material includes metallic hard materials.

11. The method as claimed in claim 1, wherein the first and second sheet-like bases are welded to one another by supplying energy by a welding device.

12. The method as claimed in claim 1, wherein the first particulate cutting-edge material is supplied to both sides of the sheet-like bases.

* * * * *